(No Model.)
I. WILLIAMS.
TRACE FASTENER.
No. 599,755. Patented Mar. 1, 1898.
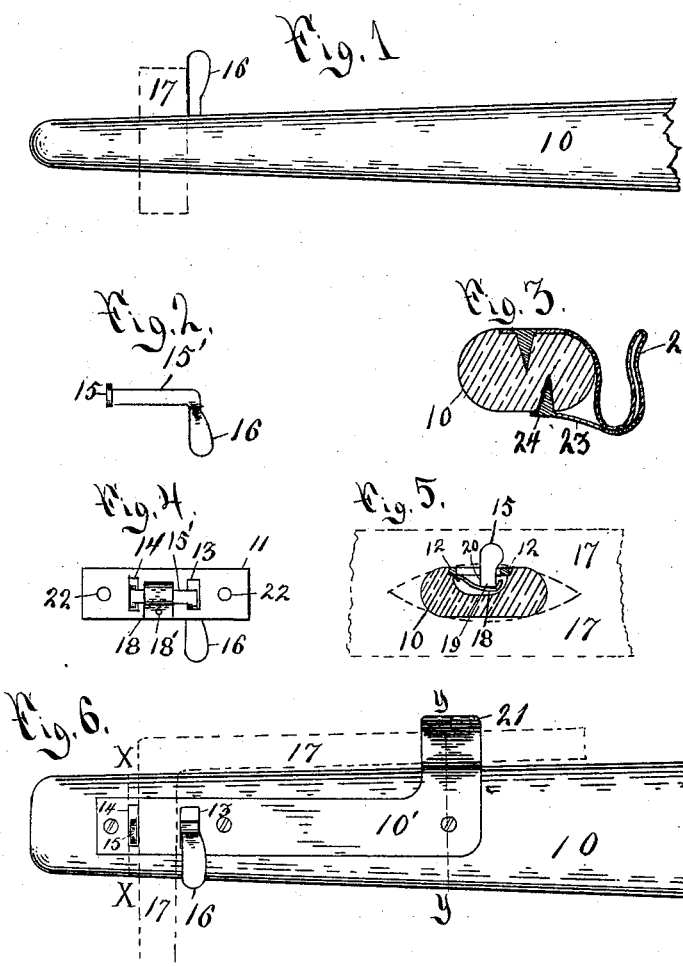
Witnesses
H. H. Warren
N. E. Thomas
Inventor
Ira Williams
By his Attorneys
Harris & Baldwin

UNITED STATES PATENT OFFICE.

IRA WILLIAMS, OF JAMESTOWN, NEW YORK.

TRACE-FASTENER.

SPECIFICATION forming part of Letters Patent No. 599,755, dated March 1, 1898.

Application filed September 20, 1897. Serial No. 652,267. (No model.)

*To all whom it may concern:*

Be it known that I, IRA WILLIAMS, a citizen of the United States, residing at Jamestown, in the county of Chautauqua and State of New York, have invented a new and useful Trace-Fastener, of which the following is a specification.

The object of my invention is to make a simple, cheap, and durable trace-fastener which will act at once like a spring-snap and rigidly hold the trace from slipping off the end of the singletree.

There are many kinds of trace-fasteners in use, the most common being a short leather strap tacked to the singletree on one side of the trace and passing through a hole in the singletree on the other side of the trace. My aim is to make a spring-catch that is simple, that the mud cannot clog, that can be operated in the darkest night, and that is always ready for use, all of which will be fully understood by this specification and the accompanying drawings, in which—

Figure 1 shows a side elevation of end of singletree with handle of catch raised. Fig. 2 is a detail view of catch-bar. Fig. 3 is a sectional view of slack-holder at Y in Fig. 6. Fig. 4 is a view of the under side of catch, showing spring. Fig. 5 is a sectional view of end of singletree at X in Fig. 6. Fig. 6 is a plan view of end of singletree with catch and slack-holder combined.

In the drawings, 10 represents the end of a singletree.

11 is a small thin metal plate with screw-holes 22 22 to fasten it to the singletree. This plate is countersunk on the upper side of the singletree, as shown at 12 in Fig. 5, leaving the top of the plate just flush with the top of the singletree. In this metal plate are the two slots 13 14, the tongue 15 of the catch working in slot 14, and the handle 16 of the catch-bar working in slot 13.

18 is a spring riveted at 18', Fig. 4, to the metal plate 11, which spring bends down around the straight square body 15' of the catch-bar, Figs. 4 and 5, holding the square catch-bar rigidly against the under side of plate 11 and springing from flat side 19 to flat side 20 around the angle of the square corner when handle 16 is raised. Tongue 15 turns down into slot 14 when handle 16 raises and is entirely out of the way, so that trace 17 can be slipped on as far as handle 16, as in Fig. 1, handle 16 acting as a guide to show just how far to slip the trace onto the singletree. Handle 16 is then snapped down, as in Fig. 5, and tongue 15 rises and holds the trace secure, as in Fig. 5.

The metal plate 11 may be made short, as in Fig. 4, or the plate may be extended, as plate 10' in Fig. 6, and be part of an angle-piece, the one end of the angle-piece being formed into a spring slack-holder 21, as shown in Figs. 3 and 6. I make this spring slack-holder in an improved manner over those now in use by making this part of the angle-piece long enough to bend back and downward and around the lower end of the spring-loop, fastening to the under side of the singletree with a screw, as shown in Fig. 3. This construction makes the whole loop much firmer and stronger, and the metal strap at 23 closes the space between the loop and the singletree, so that a horse's tail cannot be caught therein and stripped when whipping flies. It will be recognized at once that the stripping of a horse's tail and the consequent disfigurement of the animal is a vital defect in any fixture pertaining to the hitching arrangements of a vehicle. My improvement entirely does away with this objection and at the same time strengthens and improves the spring-loop.

Having fully described my invention, what I claim as new, and desire to secure by Letters Patent, is—

1. In a trace-fastener, a spring-catch consisting of a metal plate with openings therein, a spring attached to said plate, a catch-bar with square body and a handle and tongue to work in said openings, substantially as shown and described and for the purpose set forth.

2. In a trace-fastener, a metal strip attached to the upper side of the singletree and bent to form a spring-loop to hold the trace, the outer lip of the loop bent down and around the spring-loop and attached to the under side of the singletree, as shown and described and for the purpose set forth.

3. In a trace-fastener, a spring-catch consisting of a metal plate with openings, a catch-bar with tongue and handle to work in said openings, a spring to work on the squared sides of said catch-bar, a spring-loop slack-holder with the outer lip bent down and attached to the under side of the singletree, substantially as shown and described and for the purpose set forth.

4. In a trace-fastener, metal plate 10' with openings 13 and 14, square catch-bar 15' with handle 16 and tongue 15, spring 18, spring-loop 21 with retaining-strap 23, all made to operate in the manner and for the purpose set forth.

In witness that I claim the foregoing I hereunto set my hand in the presence of two witnesses.

IRA WILLIAMS.

In presence of—
H. H. WARREN,
N. E. THOMAS.